C. OLIVETTI.
MAGNETO ELECTRIC MACHINE.
APPLICATION FILED JUNE 19, 1919.
1,423,141.
Patented July 18, 1922.
3 SHEETS—SHEET 1.
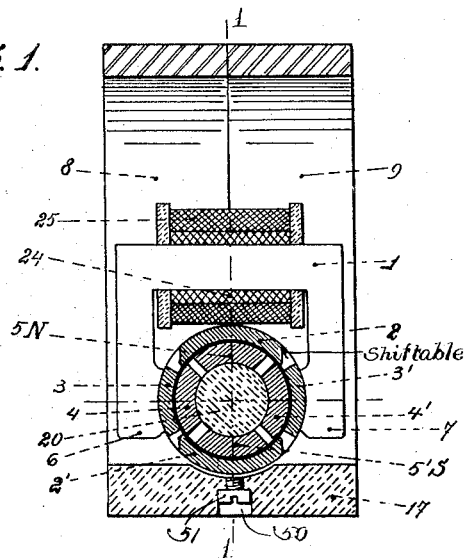
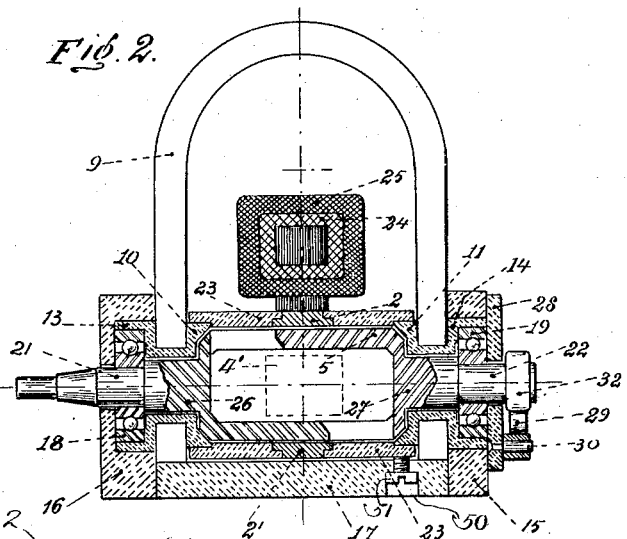
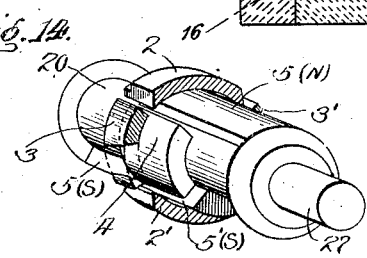
Inventor:
Camillo Olivetti
By
Attorney C. OLIVETTI.
MAGNETO ELECTRIC MACHINE.
APPLICATION FILED JUNE 19, 1919.
1,423,141.
Patented July 18, 1922.
3 SHEETS—SHEET 2.
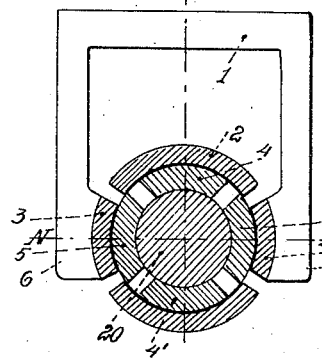
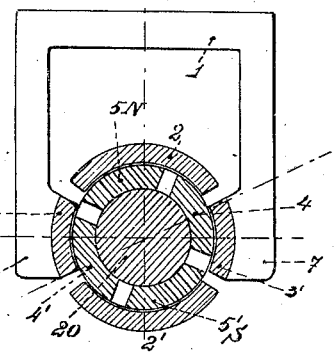
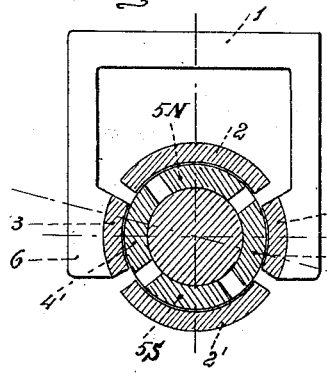
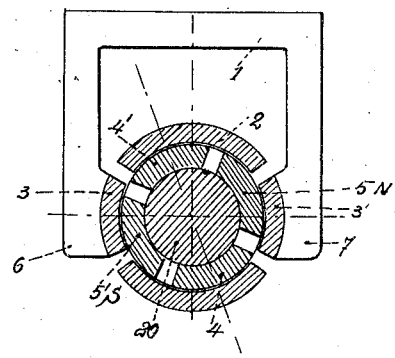
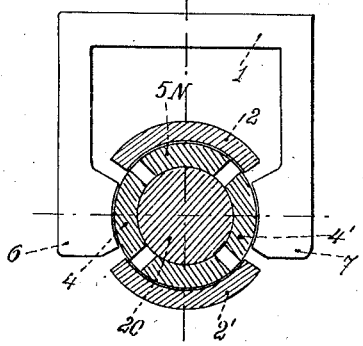
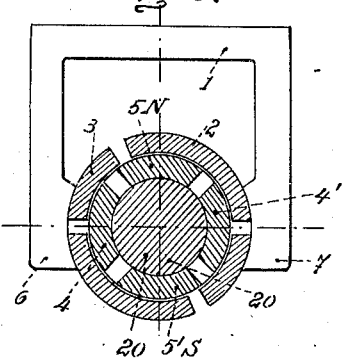
Inventor:
Camillo Olivetti
By [signature]
Attorney.

C. OLIVETTI.
MAGNETO ELECTRIC MACHINE.
APPLICATION FILED JUNE 19, 1919.

1,423,141.

Patented July 18, 1922.
3 SHEETS—SHEET 3.

Inventor:
Camillo Olivetti
By [signature]
Attorney.

the special case of engines whose cylinders are arranged in the form of a V whatever be the angle between the axes of the cylinders.

UNITED STATES PATENT OFFICE.

CAMILLO OLIVETTI, OF IVREA, ITALY.

MAGNETO ELECTRIC MACHINE.

1,423,141.   Specification of Letters Patent.   Patented July 18, 1922.

Application filed June 19, 1919.  Serial No. 305,381.

*To all whom it may concern:*

Be it known that I, CAMILLO OLIVETTI, a subject of the King of Italy, residing at Ivrea, Kingdom of Italy, have invented certain new and useful Improvements in Magneto Electric Machines, of which the following is a specification.

This invention relates to that type of magneto electric machine usually called a "magneto", and serving to generate electric currents for various purposes, but particularly for producing sparks in the sparking plugs of internal combustion engines.

The machine of this invention, according to the embodiment herein described and illustrated is of the type having fixed magnets and also fixed armatures, and its rotor is formed of an assemblage of parts formed of magnetic material which, as will be described later, produces in the armature at each complete revolution of the assemblage, six reversals in the direction of the magnetic flux and therefore six maxima of voltage of which three are positive and three negative. The said six maxima may occur at equal angular distances from each other, that is, at 60°, or at different and predetermined angular distances but such is the arrangement, however, that each maximum is diametrically opposite another maximum, so that at each half revolution the magnetic phenomena occur in the same sequence by reason of the symmetry of the parts of which the machine is composed, and consequently the six maxima may be arranged on three diameters. The angles which separate the three diameters may vary as will be seen later, according to the construction or arrangement of the machine. One of the cases of the greatest practical importance,—excepting that in which there are six maxima at 60°—is that of four maxima at 90° apart. In another case of six maxima, four occur at 90° apart, the two other maxima occurring respectively 30° from the first and fourth maxima of current. This angle may, however, vary within certain limits. The six maxima at 60° or the four maxima at 90° may be employed for high speed engines, or engines having several cylinders with the object of enabling the speed of the magneto to be one-third or one-half that of an ordinary bi-polar magneto. The maxima at different angular distances may be employed in the special case of engines whose cylinders are arranged in the form of a V whatever be the angle between the axes of the cylinders.

In the accompanying drawings,

Figure 1 is a vertical section on the line 1—1 Fig. 2.

Fig. 2 is a vertical axial section of the machine.

Figs. 3, 4, 5 and 6 are diagrammatic sections on the line 1—1 showing the different positions of the rotor or armature in the course of a complete revolution of a magneto electric machine having six maxima of which four are at 90°.

Fig. 7 is a diagram of the same machine but in which a number of parts—to be described later and which will hereinafter be termed a field regulator—are omitted.

Fig. 8 shows the diagram of a machine provided with said field regulator showing the position it is made to occupy so that the machine will give two maxima only of voltage, one of which is positive and one negative, in the armature for each complete rotation of the rotor.

Fig. 14 is an isometric view of the rotor showing the segments 4, 4' and 5, 5'.

Figure 9:
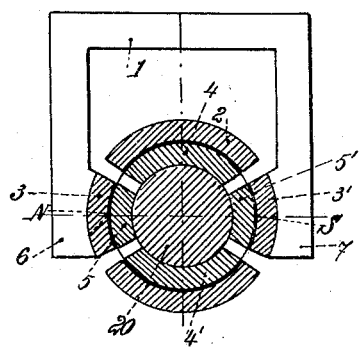
Figs. 9, 10, 11 and 12 are diagrammatic sections of a magneto electric machine having six maxima at 60° apart and show the different positions of the rotor for one complete revolution.
Figure 10:
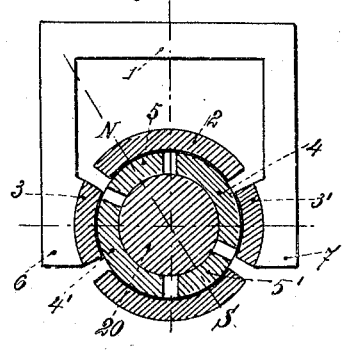
Figure 11:
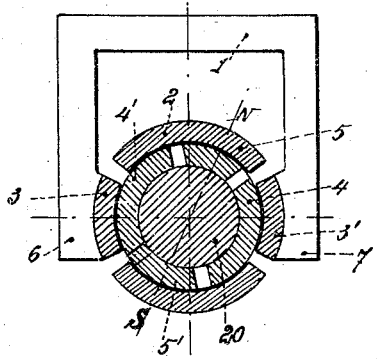
Figure 12:
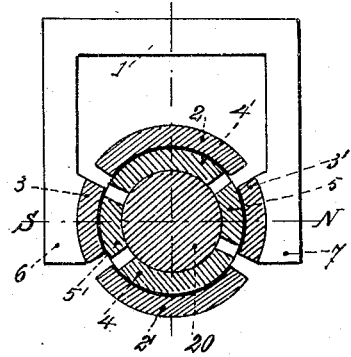

Referring to Figs. 1 and 2 the magneto electric machine is formed of two permanent magnets, 8 and 9. However, in place of two magnets there may be a single magnet or there may be more than two arranged side by side and superimposed—placed at right angles to the axis of rotation of the magneto. The pole ends of the magnet rest upon two pole pieces, 10 and 11 formed of soft iron or other magnetic metal. The pole pieces are of circular shape and may, while remaining in contact with the magnets, turn coaxially at a given angle with respect to the rotor. For this reason circular prolongations, 13 and 14 are provided which can turn in cavities formed in the supports 15 and 16 which form the sides of the machine and are assembled upon a base 17. The prolongations 13 and 14 of the pole pieces 10 and 11 support internally the ball bearings 18 and 19 which may be replaced by ordinary bearings in which the main shaft of the machine turns. The two pole pieces 10 and 11 are connected with each other by means of a sleeve 23 of non-magnetic material. The sleeve 23, as well as the pole pieces 10 and 11, enclose a space in which the rotor turns. Within the sleeve 23 are arranged at nearly equal distances from the pole pieces 10 and 11, four circular crown segments, 2—2′, 3—3′ formed of magnetic metal which may be laminated or otherwise. The sleeve 23 with the crown segments 2—2′, 3—3′ is shiftably secured by any suitable means, as for instance, set screw 51 in an opening 50 in base 17.

Between these segments is a space which may vary within certain limits; the angle subtended by them may also vary according to the angular distance at which the maxima of electromotive force, generated by the magneto should occur.

Although this assemblage of parts is termed "field regulator," its function is much more important than that of a mere regulator. All the parts forming the field regulator which are fast with the pole pieces 10 and 11 can turn through a certain angle with the latter. Upon the outer periphery of the segments 3 and 3′ rest and rub gently the ends 6 and 7 of a bridge 1, which is formed of magnetic metal and may be laminated or otherwise. The bridge forms the armature of the machine and its upper horizontal portion is provided with insulated windings 24 and 25. The extent to which the field regulator is rotated should be such that the segments 2 and 2′ cannot touch the ends 6 and 7 of the bridge 1. The rotor has two stub shafts 21 and 22 supported by bearings 18 and 19. The shaft 21, carries a hub 26 and the shaft 22, a hub 27 which are prolonged to form circular crown segments 5′ and 5 respectively. The hubs 26 and 27 as well as the segments 5′ and 5 are of magnetic metal and, as illustrated in the accompanying drawing, are provided with a very extended surface, which should, during rotation, be maintained very close to the pole pieces 10 and 11 so as to form with them magnetically a single piece. The internal surface of the pole pieces 10 and 11, as well as the outer surface of the hubs 26 and 27 are conical in order to form a more serviceable construction. The two segments 5′ and 5 connected to the hubs 26 and 27 form a pole piece for the magnets and rotate with the magneto shaft and during rotation always maintain the same polarity. The two hubs 26 and 27 are connected together by a block 20, of non-magnetic metal upon which two other circular crown segments 4 and 4′ are fixed, see Fig. 1. These segments are insulated magnetically from the movable segments 5 and 5′ and are of a length nearly equal to that of segments 2 and 2′, 3 and 3′ of the field regulator within which they turn.

The angles subtended by the segments 5 and 5′, as well as those of the segments 4 and 4′, may vary according to the angular distances between the maxima of electromotive force produced by the magneto. In order better to understand the method in which the apparatus works, reference will be had to the diagrams, Figs. 3, 4, 5 and 6. In these figures, 5 is a movable pole piece in contact with the north or positive pole of the magnet, while 5′ is a movable pole piece in contact with the south or negative pole. It will be supposed that the outer lines of magnetic induction pass from the north pole to the south pole.

In Fig. 3 the flux starting from the north pole piece 5 will pass through the segment 3, enter the armature 1 from the end 6 and pass out at the end 7; on traversing the segment 3′ the line of force will reach the south pole piece 5′ of the magneto. It will be seen that a small part of the flux instead of traversing the armature 1, will pass from the pole piece 5 to the pole piece 5′ through the segments 2 and 2′. This may be avoided by lessening the angle subtended by the pole pieces 5 and 5′, but it is not necessary as passage of the flux therethrough occurs at a moment when no variations of magnetic induction takes place in the armature and consequently when no electromotive force is produced. When said force is generated no shunting of the flux takes place.

Suppose therefore that the rotor, that is, the segments 5 and 5′ and the segments 4 and 4′, having turned through a certain given angle, come into the position indicated in Fig. 4. In this case the flux passing out from north pole piece 5, will traverse the segment 2, from which it will pass to the segment 4, and from segment 4 it will reach the segment 3′, and then from this will pass to the armature 1, entering from the end 7 and passing out through the end 6, and after successively traversing the segments 3, 4′ and 2′ will regain the south pole segment 5′. The armature is therefore traversed by magnetic flux in a direction opposite to the preceding, for while in Fig. 3 the flux came from the north pole and entered the armature from the end 6, now it will enter through the end 7.

Suppose that the rotor has continued its travel and is coming into the position shown in Fig. 5. The flux coming from the north pole segment 5 will traverse the fixed segment 2, then pass to the movable segment 4′ and after traversing the fixed segment 3 will enter the armature from the end 6, the flux thereupon passing out from the armature by the end 7, will pass to the segment 3′ and thence to the segment 4, and afterwards to 2′ where it will regain the south pole segment 5′. The flux which traverses the armature will thus again have been reversed in direction. Suppose also that the rotor continues its movement and comes into the position shown in Fig. 6. In this case the flux passing from the north pole segment 5, will traverse the segment 3′ and will then pass into the armature from the end 7 and out by the end 6, and after traversing the segment 3 it will regain the south pole segment 5′, the flux traversing the armature having been again reversed in direction.

By means of another small displacement, in the course of which no change in the direction of the magnetic flux takes place, a position will be obtained symmetrical with that of starting position. A half revolution will thus be completed during which the direction of the magnetic flux in the armature 1 has been reversed three times. In the second half revolution the same phenomena take place identically and the direction of the magnetic flux in the armature will again be reversed three times. During the said six changes of direction of the lines of magnetic induction in the armature 1, as shown in Figs. 3, 4, 5 and 6, in an insulated winding 24 and 25, wound upon the said armature 1, Figs. 1 and 2 there will be induced electromotive forces, having three positive maxima and three negative, for each complete revolution of the rotor.

On examining Figs. 3, 4, 5 and 6, it will be seen that the second change of direction, (Fig. 5) and therefore the second maximum of voltage, takes place at about 30° from the first (Fig. 4) and at 60° from the third, (Fig. 6) as above described. The dotted lines indicated diagrammatically in Figs. 4, 5 and 6 show approximately the positions in which the maxima of electro motive force are produced. The said diagrams also show that the magentic circuit always remains closed.

Figs. 9, 10, 11 and 12 show a magneto capable of producing six changes of direction and therefore six maxima at equal angular distances apart, that is, at 60°. In the case above described the two pole segments 5 and 5′ as well as the segments 4 and 4′ forming the rotor, were of equal angular length but in this latter apparatus the angles subtended by the two movable segments 5 and 5′ are substantially smaller than those of the two segments 4 and 4′. The angles subtended by the segments 2 and 2′ and 3 and 3′ always remain the same. All the magnetic phenomena and the changes of direction, take place in the same manner as above described, the only difference being in the angle between the points at which the reversals take place, which angle is indicated by the dotted lines in Figs. 10, 11 and 12, and which, moreover, is always equal to 60°.

Figure 13:
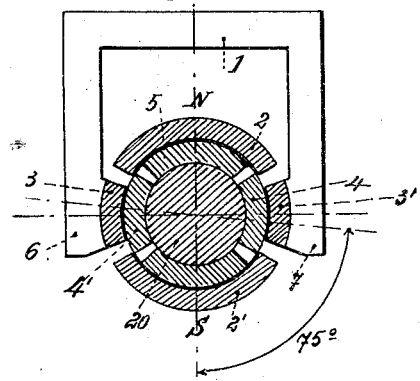
Fig. 13 is a diagram of a machine which can produce six maxima, of which four are on two diameters 75° apart.

Fig. 13 shows a magneto which can produce four changes of direction and consequently four maxima of voltage on two diameters (indicated by the dotted lines) at 75° apart, and the two other maxima on an intermediate diameter. In order to obtain this angle, the angles subtended by the segments 2, 2′, 3, 3′, of the field regulator, as well as those of the segments forming the rotor, (that is, the movable pole segments 5 and 5′ and segments 4 and 4′) have been modified.

In this case also the magnetic phenomena do not differ from those above described, except that they take place at different angular distances apart. By means of suitable variations in the angles subtended by the pole segments 5 and 5′ as well as by the segments 4 and 4′ (which together with the said pole segments form the rotor of the machine) as well as in the angles subtended by the sectors 2, 2′ and 3, 3′ forming the field regulator, any desired angle between the different reversals of the flux in the armature can be obtained and consequently between the different maxima of electro-motive force, in the windings 24 and 25 upon the armature. In this magneto as well as in other high tension magnetos the spark is obtained by induction.

Referring to Fig. 1, around the armature 1 are wound two windings of which one, 24, of thick wire consisting of a small number of turns termed the low tension winding, and the other, 25, arranged in a series with the first and composed of a great number of turns of thin wire is termed the high tension winding. The low tension circuit is closed by a contact breaker indicated by 29, 30 and 32 Fig. 2, of any suitable construction, which is opened at the proper moment by suitable means.

It may be desirable when the magneto is employed with internal combustion engines to regulate the firing in such a manner that it takes place at different positions of the piston according to the speed of the engine. This result may be obtained by moving the field regulator a predetermined angle.

The field regulator is formed of four segments 2, 2′ and 3, 3′, the non-magnetic sleeve 23 and the pole pieces 10 and 11, the prolongations 14 of the pole piece 11, being fixed to the plate 28, which supports the contact breaker by means of a screw or the like. The positions of the maximum of electro-motive force will thereby be moved and the contact breaker operated at its most favorable position. It may further be remarked that if the field regulator be turned in the position indicated in Fig. 8, the magneto will be transformed into an ordinary magneto capable of giving two sparks only for each complete revolution. In effect, the parts 2 and 3′, 2′ and 3 become in this case a mere prolongation of the armature 1, while the segments 4 and 4' will have for their sole object that of maintaining the magnetic circuit closed.

Whatever may be the position of the field regulator the magneto can always give maxima of electro-motive force. These maxima may be six and two per revolution according to the position of the regulator.

When it is not necessary to vary the positions of the maxima of electro-motive force, and therefore the positions in which the spark should be discharged, the field regulator may be omitted. The magneto will then be constructed as shown in Fig. 7 (in which the segments 3 and 3' are omitted) and in which the segments 2 and 2' of magnetic material, laminated or otherwise, are fixed in the position indicated and magnetically insulated from the armature 1.

I claim as my invention:

1. A bi-polar magneto having a stator constituted by permanent magnetic means, a core provided with a winding and a pair of poles; a rotor having two segments of magnetic material, each permanently connected to one pole of the magnetic means; an element carried by the stator and having a plurality of pole pieces isolated magnetically from each other, one of said pole pieces being in magnetic contact with one of said core poles and another being in magnetic contact with the other of said core poles and the other pole pieces being located between the two aforesaid pole pieces and being in structure magnetically isolated from the poles of the core; and means carried by the rotor for alternately connecting magnetically said isolated pole pieces to said poles of the core.

2. In a bi-polar magneto, in combination magnet poles; a core having a winding and a pair of poles; a rotor having means in permanent magnetic connection with the magnet poles and adapted to intermittently magnetically connect each of the magnet poles with one of the poles of the core when said means are directly in line therewith; and means for indirectly connecting the poles of the core magnetically to opposite magnet poles when said rotor means is in a position intermediate said poles of the core.

3. A magneto having a core provided with a winding; a permanent magnet having but two permanently magnetized poles adapted to rotate between a pair of terminal portions for the core to cause a flow of flux therethrough when the magnetized poles are opposite said terminal portions to thereby produce two maxima of voltage for each revolution of the magnetized poles; and means whereby flux is caused to flow from said magnetized poles through said terminal portions of the core indirectly when the magnetized poles are located in predetermined positions intermediate the aforesaid maxima positions to thereby produce in each revolution of the magnetized poles a plurality of maxima in addition to the two maxima aforesaid.

4. A magneto having a core provided with a winding; a permanent magnet having but two permanently magnetized poles adapted to rotate between a pair of terminal portions for the core to cause a flow of flux therethrough when the magnetized poles are opposite said terminal portions to thereby produce two maxima of voltage for each revolution of the magnetized poles; and means comprising elements of magnetic material rotating with but structurally magnetically isolated from said magnetized poles through which flux is caused to flow from said magnetized poles to said terminal portions of the core when the magnetized poles are located in predetermined positions intermediate the aforesaid maxima positions to thereby produce in each revolution of the magnetized poles a plurality of maxima in addition to the two maxima aforesaid.

5. A magneto having a core provided with a winding; a permanent magnet having but two permanently magnetized poles adapted to rotate between a pair of terminal portions for the core to cause a flow of flux therethrough when the magnetized poles are opposite said terminal portions to thereby produce two maxima of voltage for each revolution of the magnetized poles; and means comprising elements of magnetic material rotating with but structurally magnetically isolated from said magnetized poles and elements of magnetic material mounted in predetermined positions relative to, and structurally magnetically isolated from, said core through which flux is caused to flow from said magnetized poles to said terminal portions of the core when the magnetized poles are located in said predetermined positions to thereby produce in each revolution of the magnetized poles a plurality of maxima in addition to the maxima aforesaid.

6. In a bi-polar magneto, in combination fixed magnet poles; a non-rotating core having a winding and terminal portions; and a rotor having means for directing the flux from the magnetic field created by the magnets so as to pass to the core in a direct course twice in each revolution; and means through which the magnetic flux passes indirectly to said core at least twice in each revolution of the rotor.

7. In a bi-polar magneto, in combination magnet poles; an induced member; a rotor; and means for connecting the magnet poles magnetically with the induced member for causing more than two maxima of voltage to be produced for each revolution of the rotor, said means being shiftable whereby the maxima of voltage produced for each revolution of the rotor may be reduced to two.

8. In a magneto electric machine having stator magnets, a stator induced element comprising a bridge and winding on the bridge; a rotor having a pair of diametrically opposite elements each in permanent magnetic connection with one of the poles of the stator magnets; four soft iron segments interposed between the rotor and the bridge of the induced element and magnetically isolated from each other, two diametrically opposite segments being adapted to magnetically contact with ends of the bridge and the other two being located intermediate said bridge ends; and two soft iron segments carried by the rotor and adapted to interconnect magnetically the stator segments contacting with the bridge ends so that the magnetic flux from the rotor segments connected with the magnet poles will pass both directly through the two stator segments associated with the bridge ends and indirectly to said stator segments through the isolated stator segments alternately during the rotation of the rotor.

9. In a magneto electric machine having stator magnets, a stator induced element comprising a bridge and windings on the bridge; a rotor having a pair of diametrically opposite elements each in permanent connection with one of the poles of the stator magnets; four soft iron segments interposed between the rotor and the bridge of the induced element and magnetically isolated from each other, two diametrically opposite segments being adapted to magnetically contact with ends of the bridge and the other two being located intermediate said bridge ends; and two soft iron segments carried by the rotor and adapted to interconnect magnetically the stator segments contacting with the bridge ends so that the magnetic flux from the rotor segments connected with the magnet poles will pass both directly through the two stator segments associated with the bridge ends and indirectly to said stator segments through the isolated stator segments alternately during the rotation of the rotor, said stator segments being shiftable to bring two juxtaposed segments into magnetic contact with each bridge end.

In testimony whereof I affix my signature.

CAMILLO OLIVETTI.